United States Patent
Agabob et al.

(10) Patent No.: US 9,832,532 B1
(45) Date of Patent: Nov. 28, 2017

(54) INTERACTIVE SAVE AND PURCHASE OF CONTENT AND PRODUCTS

(75) Inventors: Keith Agabob, Pleasantville, NY (US); Adam Labelson, Oyster Bay, NY (US); Patricia Gottesman, Matinecock, NY (US); Pete Caramanica, Westbury, NY (US); Ernest Chen, Brooklyn, NY (US)

(73) Assignee: CSC Holdings, LLC, Bethpage, NY (US)

( * ) Notice: Subject to any disclaimer, the term of this patent is extended or adjusted under 35 U.S.C. 154(b) by 610 days.

(21) Appl. No.: 12/389,669

(22) Filed: Feb. 20, 2009

Related U.S. Application Data

(60) Provisional application No. 61/030,000, filed on Feb. 20, 2008.

(51) Int. Cl.
*H04N 21/482* (2011.01)
*H04N 21/478* (2011.01)
*H04N 21/4784* (2011.01)

(52) U.S. Cl.
CPC ... *H04N 21/4826* (2013.01); *H04N 21/47815* (2013.01); *H04N 21/4784* (2013.01)

(58) Field of Classification Search
USPC .......................................... 725/110–112, 141
See application file for complete search history.

(56) References Cited

U.S. PATENT DOCUMENTS

| | | | | |
|---|---|---|---|---|
| 6,240,555 | B1* | 5/2001 | Shoff et al. | 725/110 |
| 7,103,908 | B2* | 9/2006 | Tomsen | G06Q 10/10 |
| | | | | 348/E7.072 |
| 7,194,754 | B2* | 3/2007 | Tomsen | G06Q 10/10 |
| | | | | 348/E7.071 |
| 2002/0013950 | A1* | 1/2002 | Tomsen | G06Q 10/10 |
| | | | | 725/109 |
| 2002/0042914 | A1* | 4/2002 | Walker | G06Q 30/02 |
| | | | | 725/36 |
| 2002/0056109 | A1* | 5/2002 | Tomsen | G06Q 10/10 |
| | | | | 725/60 |
| 2002/0104086 | A1* | 8/2002 | Tomsen | G06Q 10/10 |
| | | | | 725/42 |
| 2003/0004808 | A1* | 1/2003 | Elhaoussine et al. | 705/14 |
| 2004/0237109 | A1* | 11/2004 | Laitinen | H04L 29/06 |
| | | | | 725/62 |
| 2007/0067810 | A1* | 3/2007 | Durden et al. | 725/80 |

* cited by examiner

*Primary Examiner* — Nathan Flynn
*Assistant Examiner* — Christine Kurien
(74) *Attorney, Agent, or Firm* — Goodwin Procter LLP

(57) ABSTRACT

Advertisements are presented to users via one or more delivery methods, such as a cable-television network and the Internet. An interactive product information screen allows the user to review information about a product to be purchased and, if desired, save purchase information associated with the user and the product at a central server. Subsequently, the user requests to review the saved purchase information either via the cable-television network or the Internet and can complete the transaction using either avenue.

10 Claims, 11 Drawing Sheets

INTERACTIVE SAVE AND PURCHASE OF CONTENT AND PRODUCTS

CROSS-REFERENCE TO RELATED APPLICATIONS

This application claims priority to and the benefits of U.S. provisional patent application Ser. No. 61/030,000, entitled "Interactive Save and Purchase of Content and Products" and filed Feb. 20, 2008, the entire disclosure of which is incorporated herein by reference.

FIELD OF THE INVENTION

The invention relates generally to electronic commerce, and more specifically to facilitating the selection and purchasing of content and/or products over multiple electronic networks.

BACKGROUND

Advances in cable-television technology and the Internet have provided consumers with innumerable venues for viewing content and purchasing products. Electronic commerce has become ubiquitous across the Internet, and made it possible to purchase everything from light bulbs to houses from the comfort of a living room. Further, cable-television offerings have expanded in the last 25 years from a handful of stations to hundreds of stations, including stations sponsored solely by consumer-product companies that offer product-specific content.

Cable-television subscribers have long been able to "purchase" products directly from their service provider. However, such purchases are generally limited by or to the content available directly from the service provider itself—e.g., movies and other content licensed to the service provider. The content is typically stored on the cable system servers and broadcast to the subscribers on demand. Currently, such video-on-demand (VOD) and infomercial stations do not facilitate the immediate purchase of consumer goods offered by companies other than the cable-television service provider. Further, such features do not allow users who subscribe to more than one service from the same provider (e.g., cable-television, Internet access, land-line phone service and cellular/wireless services) to initiate and subsequently complete commercial transactions using more than one of the platforms.

SUMMARY OF THE INVENTION

Embodiment of the invention provide a common, configurable electronic "overlay" that automatically appears over broadcast television and previously stored video content (including advertisements), allowing the viewer to save the content and/or procure assets (i.e., goods and/or services) being offered using a cable-television interface, web interface, and/or WAP enabled wireless devices. The assets being offered may include physical goods, (e.g., consumer electronics, books, DVDs, etc.) and/or multimedia content such as video-on-demand titles or access to special broadcast content. The assets may also include information that facilitates procurement of goods or services such as URL that directs the user to another screen or website at which they can complete a transaction. In such cases, the goods and services may be offered by a third party, in which case the cable operator provides purchase information to the vendor, who then manages the sales process via email or the World Wide Web (the "web").

The overlay may be placed over broadcast television (e.g., cable-only stations such as CNN and ESPN) as well as local broadcasts such as local NBC or FOX affiliate stations. In some instances, the overly may be placed over video-on-demand (VOD) content such as purchased movies and specials as well as interactive advertising channels. The overlay may also be placed over stored video such as content played from a digital video recorder ("DVR").

The functionality and commerce infrastructure described herein may be implemented using an interactive cable-television set-top box as well as through online services offered via the Internet and wireless networks (e.g., using banner ads, co-branded pages, email ads, etc.). In various embodiments, a common "electronic wallet" captures and tracks saved content and purchase information and manages viewer profiles across both the multiple content delivery channels and technical platforms, allowing a viewer to save an item viewed in an online advertisement for subsequent viewing and/or possible purchase at a later time using her cable set-top box. Likewise, items viewed and saved using an interactive set-top box can be reviewed and/or purchased online or using a mobile device. Viewers can customize product purchases by selecting options such as color, size, quantity, delivery times or other product attributes using menu options.

Therefore, in a first aspect, the invention provides a system for presenting an offer to a consumer. The system includes an application server, a video delivery server and a transaction server. The application server initiates the presentation of an advertisement overlay that includes information about an asset, product or service being offered and an actionable interface element, such as a menu option or a selectable button. The video delivery server provides video content to a client device on which the content is displayed. The video content includes a primary video stream which covers substantially all of a viewable area of a display area (e.g., a television, computer screen, game console, handheld multimedia device or other similar display device) and also includes the advertisement overlay. The overlay appears within the viewable area and over the content provided as the primary video stream. The overlay may appear, for example, in response to a trigger event such as the start of a video broadcast or a commercial break. The transaction server detects a selection of the actionable interface element via the client device and generates a content bookmark identifying the product and the consumer, such that the content bookmark may be subsequently recalled by the consumer to facilitate viewing and/or procurement (e.g., purchase and/or delivery) of the product at a later time.

In some embodiments, the system also includes a web server (which may be part of the video delivery server or, in some cases, a separate physical server) that receives a request from the consumer to view the content bookmark and presents the content bookmark on the client device in response to the request. In some instances, the transaction server may also receive a request to purchase the product via the web server, thereby allowing users to save an advertisement via a cable-television set-top-box and purchase the product via a computer. In other embodiments, the video delivery server receives the request to review the content bookmark and presents it to the user via the cable-television interface.

Further, the video delivery server may alter the layout of the video content such that the primary video stream is compressed into a screen area substantially smaller than the viewable area of the screen and purchase information about the product in the remainder (or a portion of the remainder) of the viewable area. The transaction server may also receive an indication that the user wishes to purchase the product via either the web server or the video delivery server and effectuate the purchase by, for example, forwarding purchase information to a commerce partner or other product supplier. In some cases, the system also includes one or more data storage devices for storing the content bookmarks, purchase transaction details, advertising content, video content and related metadata.

In another embodiment, a system for presenting an offer to purchase a product to a consumer includes a web server, a transaction server and a video delivery server. The web server provides advertisements to the consumer, and the transaction server, upon detecting a user interaction with the advertisement, creates a content bookmark identifying the advertisement and the consumer. The video delivery server subsequently provides the content bookmark to the consumer via a cable-television delivery channel, thereby facilitating the purchase of the product via a cable-television set-top-box.

In some implementations, the video delivery server further provides video content including a primary video stream covering substantially all of a viewable area and, in response to a trigger event, also includes the content bookmark, which is presented within the viewable area and over the primary video stream. The trigger event may be initiated by the user (e.g., selecting a menu option, changing a channel, etc.) or by the MSO. The transaction server may also receive a request to purchase the product via the video delivery system, and, in response to the request, present the primary video stream into a screen area substantially smaller than the viewable area and provide purchase information about the product in the remainder of the viewable area.

In another aspect, the invention provides a method for facilitating the purchase of a product by a subscriber to a service provider offering both cable-television subscription services and Internet connectivity services, such as broadband, fiber optic, and/or dial-up. The method includes providing an interactive product information screen to the subscriber via the cable-television service, allowing the subscriber to review information about a product to be purchased and indicate interest in purchasing the product. The purchase information associated with the subscriber and the product is saved at a central server. A request to review the saved purchase information is received from a client computer via the Internet service, and in response a web page is provided to the subscriber's computer comprising the purchase information. Purchase instructions are received from the subscriber via the web page and processed accordingly.

In another aspect, the invention provides a method for facilitating the purchase of a product by a subscriber to a service provider offering both cable-television subscription services and Internet connectivity services. The method includes providing a web page to the subscriber's client computer via the Internet, thus allowing the subscriber to review information about the product and indicate an interest in purchasing the product. In response to the user indicating her interest in the product, purchase information associated with the subscriber and the product is saved at a central server. Subsequently, a request to review the saved purchase information is received from the subscriber via an interactive cable-television set-top-box. In response to the request, the purchase information is presented to the subscriber as part of an interactive product information screen on the set-top-box. Purchase information is received from the subscriber via the set-top-box and processed to complete the purchase transaction.

In some embodiments, viewer profiles are created and used to target specific ads and/or products to viewers. For example, an advertiser may run a second commercial spot for a particular product, and all viewers will receive the same broadcast commercial for that product. Viewer profiles facilitates the creation of multiple, targeted ads for a single product and the ad selected for an individual may be based on his demographic, psychographic or geographic profile. An interactive advertising campaign management system manages the offering and tracking of products, purchases and campaign details, and an interactive advertising reporting system provides detailed information across users, products and campaigns.

In another aspect, the invention provides an article of manufacture having a computer-readable medium with computer-readable instructions embodied thereon for performing the methods and implementing the systems described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
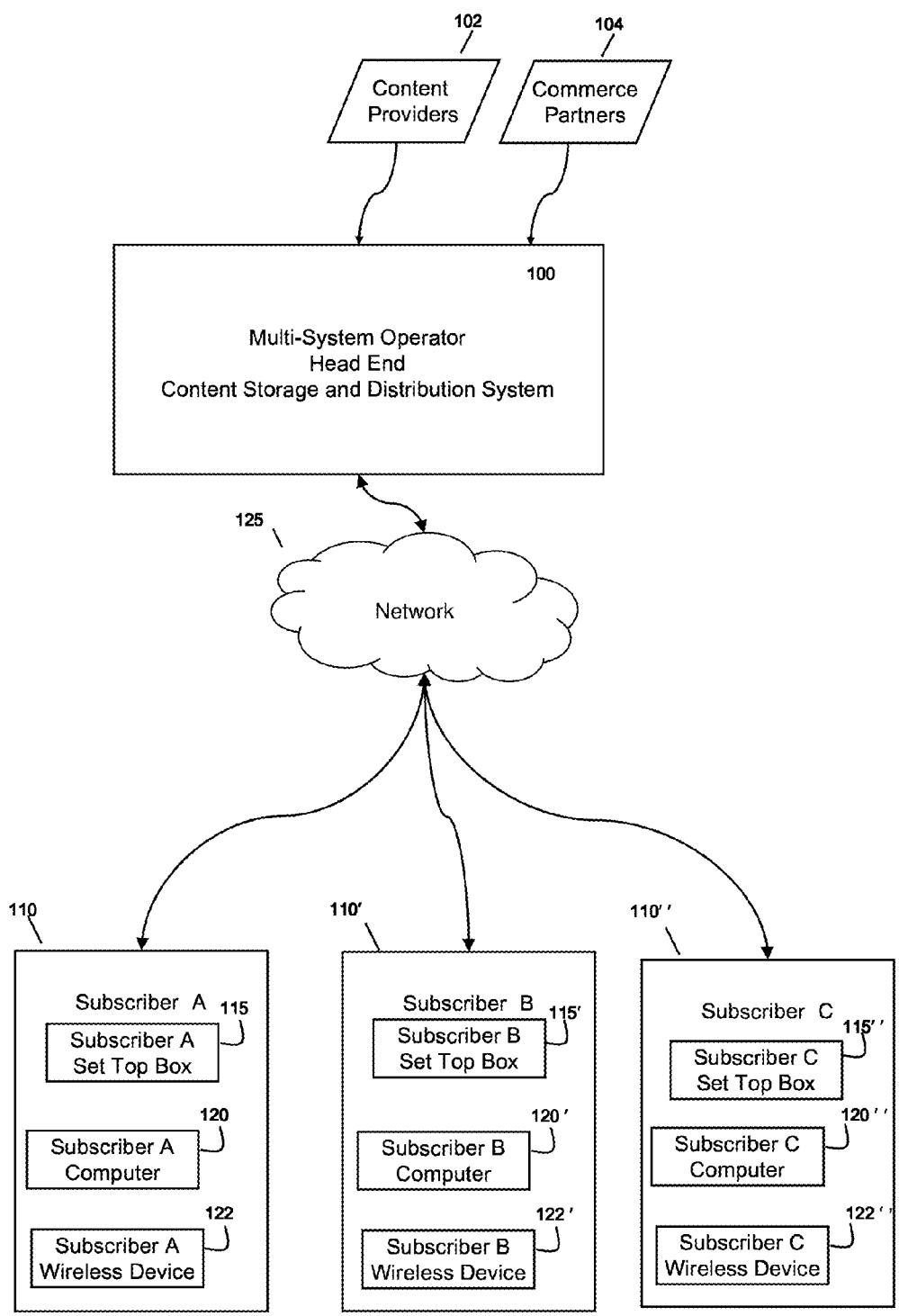
FIG. 1 is a block diagram of an exemplary network for delivering media content according to an embodiment of the invention.

FIG. 1 illustrates the general operational environment in which a media and product commerce, storage and distribution system 100 (the "system") may be implemented in accordance with various embodiments of the invention. Although the system 100 may be owned, operated, leased, or licensed to or from any media entity (e.g., a broadcast or telecast or private network, an Internet service provider, web site operator, etc.) for ease of presentation the system 100 will herein be assumed to be owned and operated by a cable-television service provider or similar multiple system operator ("MSO"). In such cases, the system 100 is typically located at the "head-end" of a cable network. In large implementations, there may be more than one head-end, each servicing different geographic regions, for example.

Content providers 102 provide media content to the MSO, typically via satellite and in digital form, for subsequent distribution by the MSO. Multiple end-users (referred to herein as "users," "viewers" or "subscribers") subscribe to the services (channels, broadband Internet access, telephone services, etc.) provided by the MSO, including access to the system 100. In addition, commerce partners 104 may also provide commercial content to the MSO to be presented to subscribers as advertisements. The advertisements may be presented as an overlay on a broadcast television signal or, alternatively, as a banner ad, pop-up ad, or other ad placed on or over a web page delivered to a computer, PDA, gaming console or cellular phone or other computing device. As shown, the system 100 services three subscribers 110, 110' and 110", for exemplary purposes, but there may be any number of subscribers 110. In some implementations, the system 100 may be provided as part of a standard set of services offered by the MSO, whereas in other cases access and use of the system 100 may be limited to certain subscribers 110, such as those paying additional subscription fees.

To access the broadcast or stored content via a television, subscribers are issued a set-top-box 115, or, in some embodiments a cable card (or similar device) that may be inserted into a television or other display device, typically located at the subscriber's home or business. The set-top-box is used to access the cable network, decode and display the multimedia content of the cable TV channels, and in some cases interact with applications and other services (e.g., video-on-demand, shopping) provided by the MSO. A display unit such as a television or video monitor (not shown) is coupled to the set-top-box 115, and facilitates the viewing of video programs and multimedia content provided by the MSO. The set-top-box 115 may include an interface that enables the use of a remote control (e.g., an infra-red or radio-frequency transmitter), thereby allowing subscribers 110 to direct the functionality of the set-top-box 115 and cause the transmission of commands from the set-top-box 115 to the head-end.

In other implementations, the set-top-box 115 may be replaced or augmented with a client computer 120, a television set, or software stored on a cable card, which allows subscribers to view and record digital cable television channels on digital video recorders, personal computers and televisions without the use of a set-top-box. The cable card is similar to a PCMCIA card used to connect laptops to networks. The functionality of the set-top-box may be implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the OSX operating system from Apple Computer of Cupertino, Calif., and various varieties of Unix, such as SUN SOLARIS from SUN MICROSYSTEMS, and GNU/Linux from RED HAT, INC. of Durham, N.C. (and others). The set-top-box functionality may also be implemented on such hardware as a smart or dumb terminal, network computer, wireless device, personal data assistant, MP3 player, wireless telephone, information appliance, workstation, minicomputer, mainframe computer, or other computing device, that is operated as a general purpose computer, or a special purpose hardware device used solely for providing subscribers with access to the system 100. In some embodiments in which the MSO provides wireless services, the subscribers 110 may also use WAP-enabled wireless devices and/or cellular telephones 122 to access the system 100.

The client computer 120 may also be used to access the Internet and World-Wide Web via the MSO, and be of any of the forms described above. In such cases, the client computer 120 may include a web browser, client software, or both. The web browser allows the client computer 120 to request a web page or other downloadable program, applet, or document (e.g., via the MSO system 100) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client computer 120 manually requests a web page from the system 100. Alternatively, the client computer 120 automatically makes requests with the web browser. Examples of commercially available web browser software include INTERNET EXPLORER, offered by Microsoft Corporation, and FIREFOX offered by the Mozilla Foundation.

In various embodiments, the set-top-box 115 and client computer 120 communicate with the system 100 over a network 125. The network 125 uses coaxial cable, fiber optics, and/or standard or enhanced telephone lines to transmit content and user commands between and among the head-end and the set-top-boxes 115 and client computers 120. In some instances in which the set-top-box functionality is provided within or as part of a personal computer, the network 125 can carry TCP/IP protocol communications and HTTP/HTTPS requests made by the set-top-box 115. Other non-limiting examples of networks that can serve as or be part of the communications network 125 include a wireless or wired Ethernet-based intranet, a local or wide-area network (LAN or WAN), and/or the Internet, which may accommodate many different communications media and protocols.

Generally, the invention facilitates the presentation and procurement of assets, products and/or services via the various services offered by the MSO. The assets being offered may include physical goods, (e.g., consumer electronics, books, DVDs, etc.) and/or multimedia content such as video-on-demand titles or access to special broadcast content. The assets may also include information that facilitates procurement of goods or services such as URL that directs the user to another screen or website at which they can complete a transaction. As used herein, procurement may include a completed purchase of a tangible good, but may also include merely the presentation of stored procurement information (e.g., a URL) that directs the user to a commerce partner's web site, call center or physical location to complete a transaction. The system 100 includes various processing, communication and storage components that, together, allow subscribers to either purchase an asset ("click-to-buy") or save content for future access, review and possible purchase of products presented in the content ("click-to-save"). The "save" scenario is enacted when an advertiser is not selling a product, but rather offering the user the ability to save the item for later (re)viewing, and is illustrated below. In both the click-to-buy and the click-to-save experiences, an overlay is presented over the broadcast or replayed video during the advertisement offering the shop or save experience.

Figure 2:
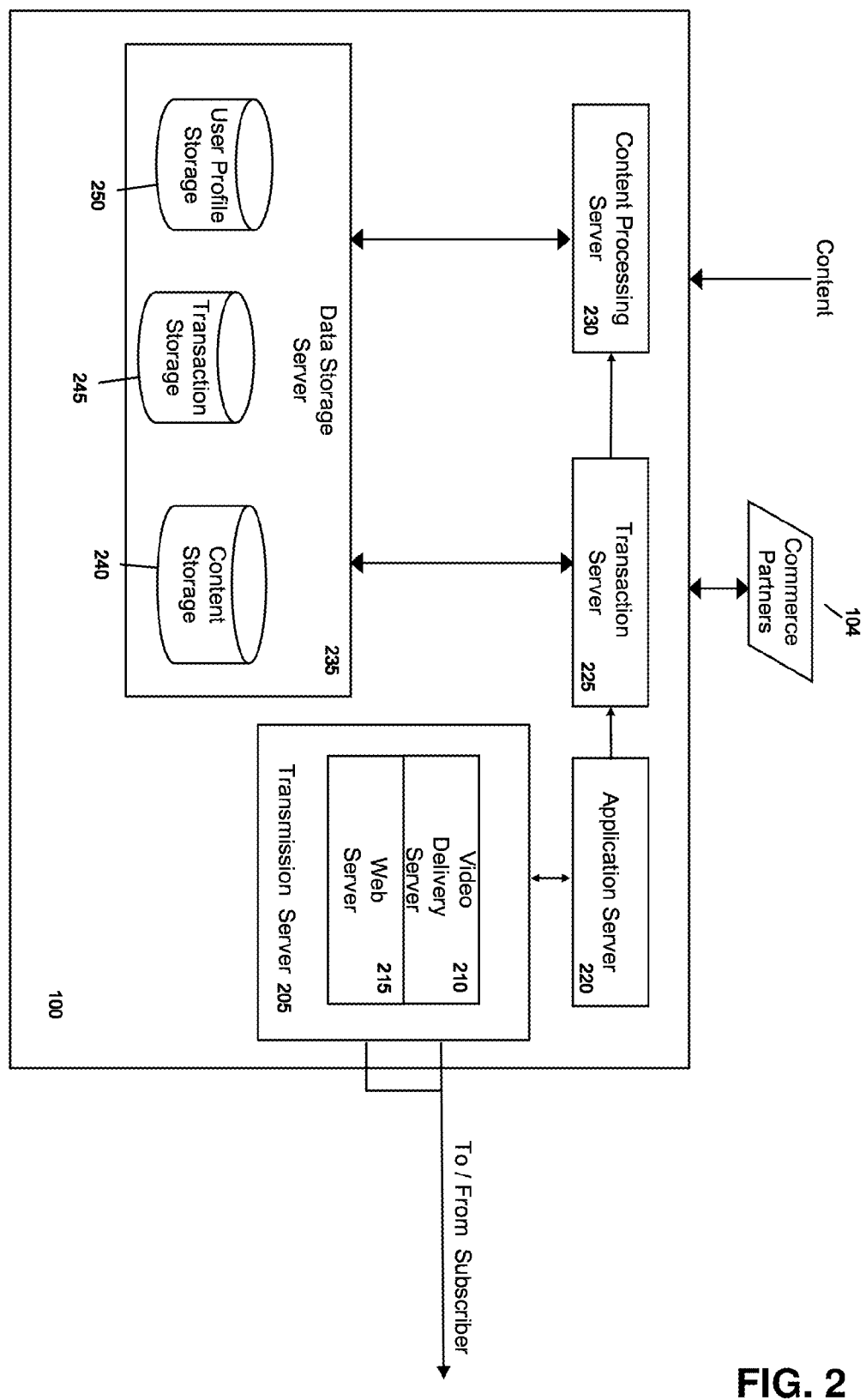
FIG. 2 is a block diagram of a system for proving video and web-based advertisements to users of the network of FIG. 1 according to an embodiment of the invention.

Referring to FIG. 2, in one embodiment, the system 100 includes a transmission server 205 that provides a communication interface with the set-top-boxes and client computers used by the subscribers. The transmission server 205 can be implemented as software running on one or more physical devices or servers, or may be implemented as a stand-alone server. In some embodiments, the transmission server 205 can provide an interface both to software residing on the set-top-box via a video delivery server 210 and/or a client computer-resident web browser via a web server 215, so that, for example, the set-top-box and the client computer can be used interchangeably to view and save content and, in some cases, purchase products or services described in the content. The set-top-box-resident software can be used, for example, to browse existing content as well as retrieve previously saved content via the transmission server 205. The interface to each of the set-top-box software and the web browser may be implemented separately or in combination. In other embodiments, the transmission server 205 can also communicate using other protocols or mechanisms.

The transmission server 205 interacts and communicates with an application server 210, which provides the main programming logic and functional instructions for the operation of the system 100. In one embodiment, the application server 220 is implemented as one or more application programs running on a server class computer, which may be the same or different computer as the transmission server 205. The application server 220 receives content requests and instructions from users via the client transmission server 205. The application server 220 also provides the infrastructure for implementing the content bookmarking and content retrieval and electronic commerce functions described in greater detail below. For example, the application server 220 determines appropriate times (both with respect to particular programming, and time of day in general) and/or appropriate users (based, for example, on previous purchases, viewing habits or other activities) to present overlays along with standard broadcast content as delivered to the set-top-box. The application server 220 may also, in some embodiments, determine an appropriate advertisement to present to the user while she is viewing a web page.

The system 100 also includes a transaction server 225. The transaction server 225 handles the tasks associated with purchases of goods and services made by users via the system 100. The transactions may include purchases of pay-per-view content provided by the MSO (e.g., premium movies or sporting events), consumer goods provided by third-party commerce sites, or purchases of goods or services from other subscribers (e.g., classified ads). The transaction server 225 provides functions such as confirmation of credit card data, account balance data, calculations related to shipping and sales tax, and other computations. The system may also include a content processing server 230 that selects and/or prepares the advertisements for presentation to the users. For example, the content processing server 220 combines product information, pricing information, and other data regarding the products and/or services being offered and creates the code (typically in the form of a mark-up language such as HTML or XML) that is sent, via the transmission server 205, to the user's set-top-box and/or client computer.

In the instances in which an advertisement is presented with broadcast or stored video content via the set-top-box, presentation of the ad may be initiated as an interactive "overlay" that appears on top or along side of the content being watched, and the user may then interact with the overlay using an input device such as a remote control. In cases in which the advertisement is presented as a web-based ad on the user's client computer, the ad may be served as a stand-alone ad (i.e., a "pop-up" ad), as part of another web page (e.g., a banner ad) or in the body of an email message. In either case, the user may view the ad and, if interested, purchase the product or service being offered. Alternatively, the user may decide that although interested in the product, she does not want to complete the purchase at that time and "bookmark" the ad for subsequent viewing and interactions. Independent of how or when the bookmarks are created, the user may retrieve a bookmark using either the client computer, the set-top-box, or other computing device in communication with the MSO, continue to view the content and, purchase the items being offered. Unlike traditional video on demand systems, this approach does not require the separate storage of content on a user's set-top-box or the need to create bookmarks within a web browser. Instead, the system recognizes the advertisement being viewed and the product or service being offered and pairs this information with user or device specific information (e.g., a MAC address, IP address, user name, account number, etc.) and creates a content bookmark associated with the user. The content bookmarks may, in some embodiments, be presented to the users as items in a "content folder" containing the ads and content they have previously saved.

In certain instances, the application server identifies or receives certain characteristics about content being viewed by the user or the context in which it is being used. These characteristics (also referred to as metadata) may include genre information about the content (e.g., action film, documentary, sports), target demographic information (males ages 22-30) and/or more specific information (names of actors, company names, etc.) and be used by the content processing server to select an advertisement for presentation to the user.

The system, in some embodiments, also includes a data storage server 235, which stores data related to the advertisements being presented to users, user profiles and user identification information, transactions initiated and completed by the users, and the content bookmarks that identify content to be recalled for future viewing and purchases. For instance, the data storage server 235 may contain separate databases for content 245 (e.g., advertisements and product related information), transactions 245 (purchases, saved content and stored content bookmarks) and user data 250 (user profiles, authentication information, account history, etc.) The data storage server 235 provides data to and receives data from the content server 230, the transaction server 225 and the application server 220 for inclusion in messages, content broadcasts, web pages, and stored procedures.

The data can, in some instances, be stored in one or more databases. The data storage server 235 can also store data relating the use and performance of the system itself, such as server availability and web traffic information. Examples of database applications that can be used to implement the data storage server 235 include the MySQL Database Server by Sun Microsystems of Santa Clara, Calif., the PostgreSQL Database Server by the PostgreSQL Global Development Group of Berkeley, Calif., and the ORACLE Database Server offered by ORACLE Corp. of Redwood Shores, Calif.

In addition or instead of the specific implementations described above, various embodiments of the invention may be provided as an article of manufacture having a computer-readable medium with computer-readable instructions embodied thereon for performing the methods described in the preceding paragraphs. In particular, the functionality of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality and techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

Figure 3:
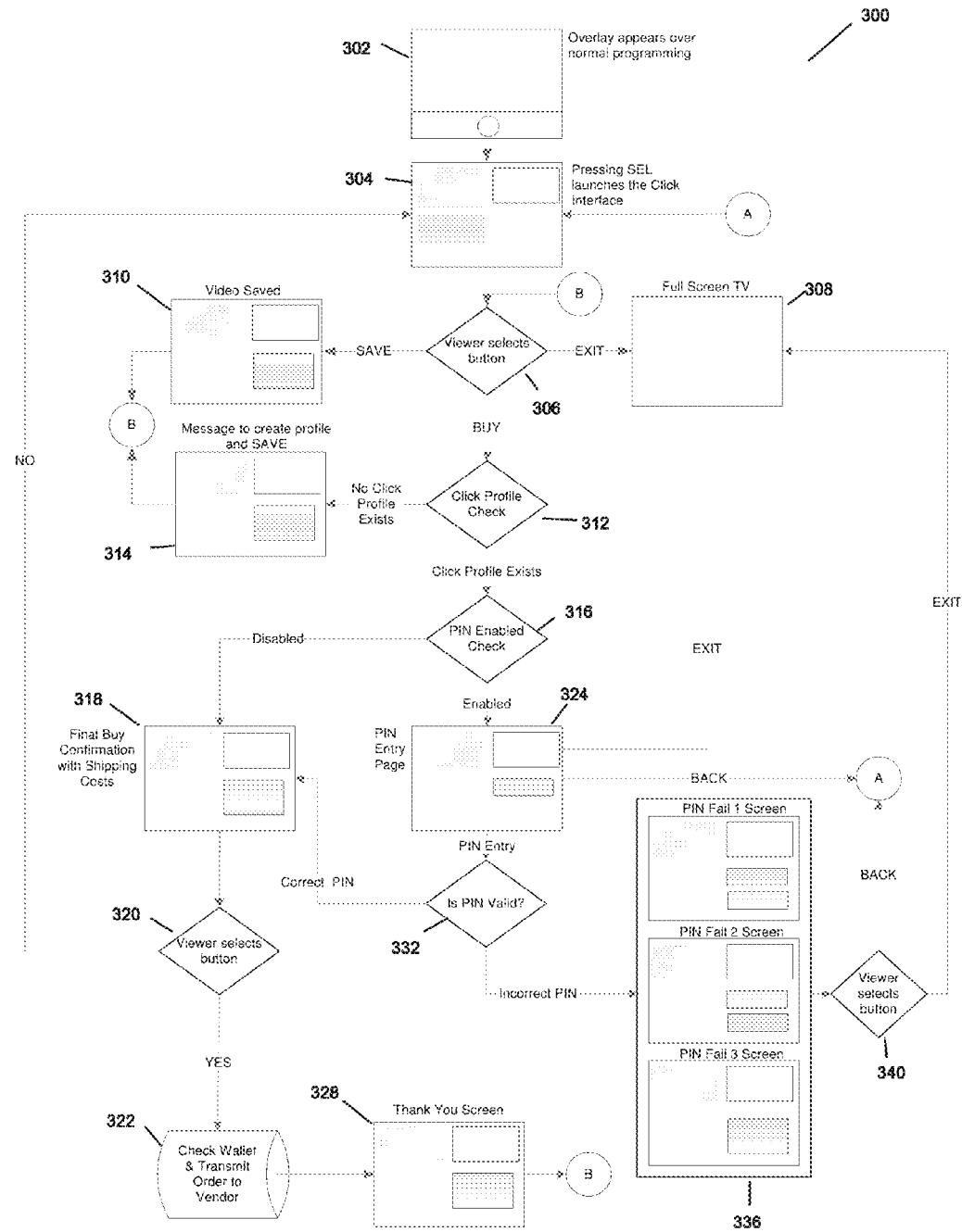
FIG. 3 is a flow chart describing user actions to save and respond to advertisements presented by the system of FIG. 2 according to an embodiment of the invention.

User access to the system in general, and the click-to-buy and click-to-save features more specifically may be provided via an authenticated session using the home ID and/or account number associated with the viewer's set-top-box or, in the case where the content is delivered via broadband, through a web browser. Referring to FIG. 3, a summary process flow 300 for presentation of the click-to-buy and click-to-save features involves viewer interactions with broadcast overlays and/or web-based advertisements using a remote control (typically in the case of a cable-television ad) or other user input device. In certain implementations, the screen area allocated to a primary video signal is squeezed back such that the offer can be presented in the newly available screen space. Users can save the content and/or complete the transaction and return to a full screen view of the primary content.

Initially, an overlay appears over the normal programming (STEP 302) indicating that an advertisement for products or services is being offered to the subscriber via the set-top-box. In some cases, the overlay appears in response to a trigger event such as the start of a particular program, a commercial, or an event initiated by the user or the MSO. The overlay may appear after an advertisement has started, such as at two seconds into the ad. In some embodiments, the overlay delay is configurable such that it can be lengthened or shortened. If the overlay is not selected by the viewer, it disappears before the ad ends, either based on a time until the end of the ad, or after some period of inactivity (e.g., the user has not selected the ad after fifteen seconds).

The overlay includes an actionable interface element (e.g., a menu option or button) that, when selected by the user causes the normal programming to be "squeezed back" into a smaller viewing area and presents the user with the save and/or purchase interface (STEP 304). If the user decides (STEP 306) they are not interested in the product or service being offered, the overlay is removed and the screen is returned to normal programming (STEP 308). If the user is interested in the product, she has two options—to either continue the purchase process (the "buy" option) or to save the advertisement for subsequent viewing and possible purchase at a later date (STEP 310).

If the user opts to buy the product being offered, the system checks to see if she has previously created a user profile (STEP 312). The user profile may include information such as credit card numbers, shipping preferences, and other data used to complete a purchase transaction, as well as personalized settings such as parental controls and previous purchase information. If no profile exists, the user is prompted to create a profile (STEP 314) and the advertisement is saved. In some implementations, a message is presented on the screen instructing the user to create a profile using a web-based application, which may also be offered by the cable service provider. In some cases, an email may be sent to the viewer's email account with instructions for creating the profile. If no profile is found, the viewer may be prompted to save the content describing the product, allowing the viewer to return to the content and purchase the product once a profile is created.

In some embodiments, the system may require the entry of a PIN (STEP 316) to allow the user to make purchases. This option is useful in the context of a cable-television-based commerce system in which multiple individuals within a single household may have access to a common set-top-box, and the requirement of a PIN may prevent certain users (e.g., children) from making unauthorized purchases. If the PIN entry requirement is not enabled, a purchase confirmation screen is presented (STEP 318). The confirmation screen may include confirmation buttons (e.g., "YES" and "NO") that allows the user to confirm or cancel the transaction (STEP 320). If cancelled, the screen may return to the full screen view (STEP 308) of the normal content, or, in some cases the squeezed back view in which the normal programming is placed in a smaller viewing area of the overall screen (STEP 304). If the user continues with the purchase process, the system transmits the order to the vendor offering the product (STEP 322) and presents the user with a thank you screen (STEP 328) completing the transaction.

If the PIN option is enabled, the user is prompted to enter a PIN via the remote control or other interactive device (STEP 324). Upon receipt of a valid PIN, the user is presented with the purchase conformation screen (STEP 318). If, however, the PIN is not recognized, one or more PIN retry screens are presented (STEP 336) at which the user may try to renter her PIN and select the purchase button (STEP 340). In some cases, only one attempt is permitted, whereas in other cases the user may be permitted multiple chances to enter a valid PIN. In certain embodiments, users are "locked out" of the system after a maximum number (e.g., three) of incorrect PIN entries.

If the user decides not to purchase the product, but instead wishes to "save" the advertisement (STEP 310) for future review and possible action (e.g., a purchase), the system creates a content bookmark associated with the user and the advertisement and saves the bookmark in a central server for subsequent presentation. A confirmation message may be provided with instructions to retrieve the saved content bookmark. In some cases, only one saved item for an individual product will appear in the viewer's stored content folder for the viewer (or in some cases a household) at a time. In some instances, saved content may expire. The expiration may be based on the content of the offer (e.g., a limited-time price or limited quantity product) or a global setting (all saved content expires after two weeks). In some embodiments, the expiration may be extended by "re-saving" the same content. In instances in which nothing is actually being purchased (the viewer merely wants to save the content for subsequent viewing), a similar workflow is used, however the viewer is only able to save the content, and the purchase-related options are omitted.

Figure 4:
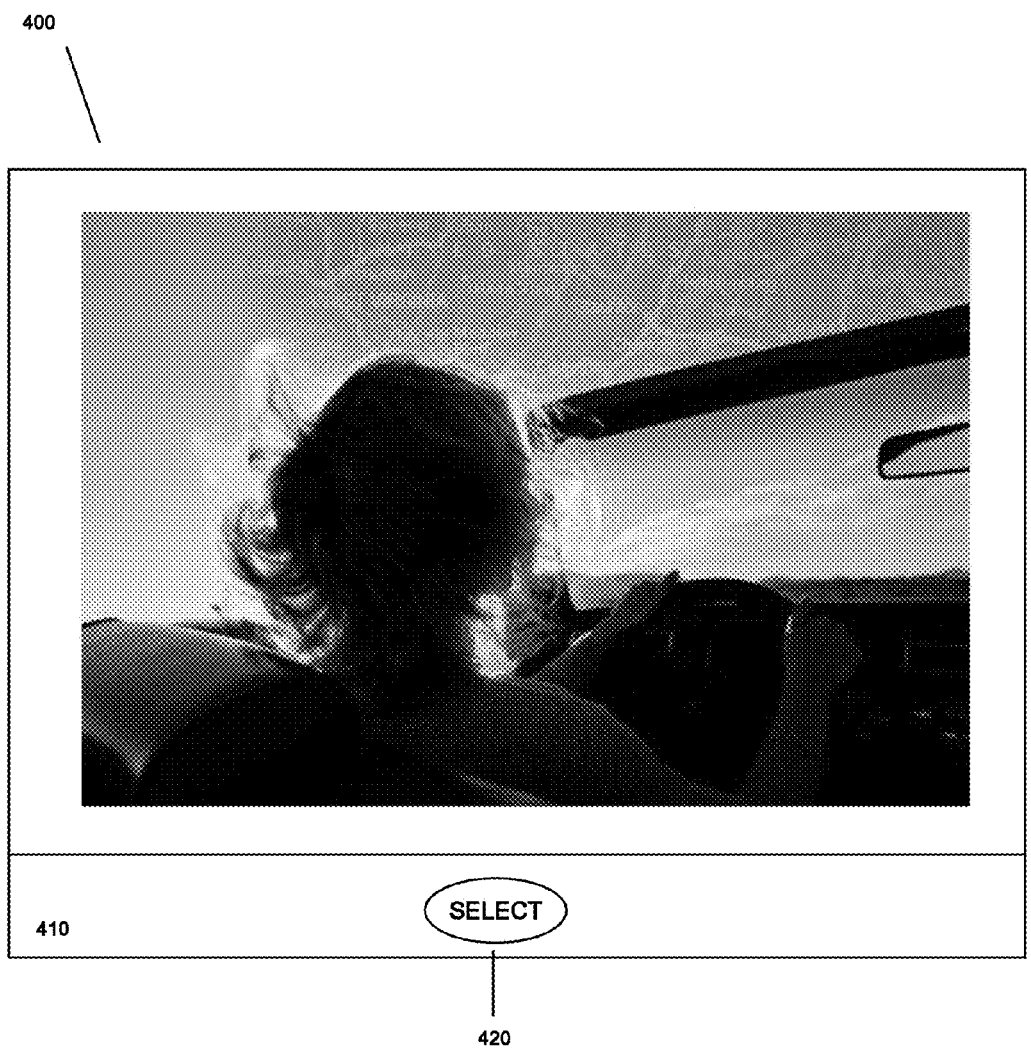
FIG. 4 is an exemplary video screen illustrating an overlay presented over a video presentation according to an embodiment of the invention.

FIGS. 4-8 illustrate one possible collection of screens that to implement the steps described above. Specifically, FIG. 4 is one example of a video screen 400 in which an advertisement overlay 410 may be positioned along an edge of the screen 400. The overlay may be allocated a particular width and height, either based on a relative size of the screen (e.g., 90% width and 10% height), or absolute size (e.g., number of pixels, inches, centimeters, etc.). Different screen allocations may be used for different image sizes and/or resolutions, such as letterbox versus standard formatting, high-definition images, etc. In one particular embodiment, the overlay may appear along the bottom edge, is not opaque, and is allocated space in screen pixels.

In some implementations, the viewer is able to interact with the overlay using her remote control device by selecting an actionable screen element 420. The following table provides an exemplary listing of buttons and respective functions.

| Button | Action |
| --- | --- |
| Arrow Left/Right | Performs same actions as on Normal Full Screen TV |
| Arrow Up/Down | Performs same actions as on Normal Full Screen TV |
| SEL | Invokes squeeze-back Click Interface. |
| EXIT | Exits to full TV and tears down overlay |
| A, B, C | Performs same actions as on Normal Full Screen TV |
| Last | Tears down overlay and toggles between current channel and prior channel |
| Page | Ignored unless overlay is placed over video on demand content |
| Video Controls | Ignored unless overlay is placed over video on demand content |
| CH +/− | Tears down overlay and tunes to next/prior channel |
| Numeric Buttons | Tears down overlay and directly tunes channel associated with numeric entry |
| Info | Info barker is displayed on top of overlay |
| Record | Tears down overlay and performs normal UI button function for 8300 set-top-boxs |
| DVR | Tears down overlay and performs normal UI button function for 8300 set-top-boxs |

When the overlay 410 is triggered (either by instructions provided by the cable system service provider, an automated trigger based on the content being shown, or user interaction), the broadcast window is scaled to an L-shaped squeeze-back ("squeeze-state") and the television broadcast (or, in other cases, saved video or video-on-demand) continues to play in a smaller window.

In some implementations, the response to a selection from the overlay is immediate (or rapid enough to avoid any perceptible lag) such that as soon as the overlay 410 is selected, the squeeze occurs and the page is rendered. The screen may remain in squeeze-state until the viewer selects an "exit" button presented on the screen or on the remote, a default duration of inactivity is reached (e.g., 20 minutes of user inactivity), or upon completion of a transaction ("teardown"). In some instances, instructions from the viewer (typically via remote) to change a channel also causes the system to exit the squeeze-state and return to a normal view.

In certain implementations, the content overlay 410 appears as an additional screen element along with other pre-defined screen elements such as an information bar, closed-caption text and/or caller ID information (for systems in which telephone service is integrated into cable and/or broadband internet service) in a manner that does not obscure existing screen elements. Additional information about the products and/or content being viewed may be requested by the viewer by, for example, pressing a button on a remote control device. In such cases, the requested information may be shown over the overlay, along side the overlay, or instead of the overlay 410. The overlay may be anchored to any position on the screen, such as at the bottom (as shown), along the top edge, along a side edge, or as an opaque overlay centered about the screen. In some embodiments, the position, size and/or presentation of the overlay may be configurable by the cable system service provider, the subscriber, or both.

Figure 5:
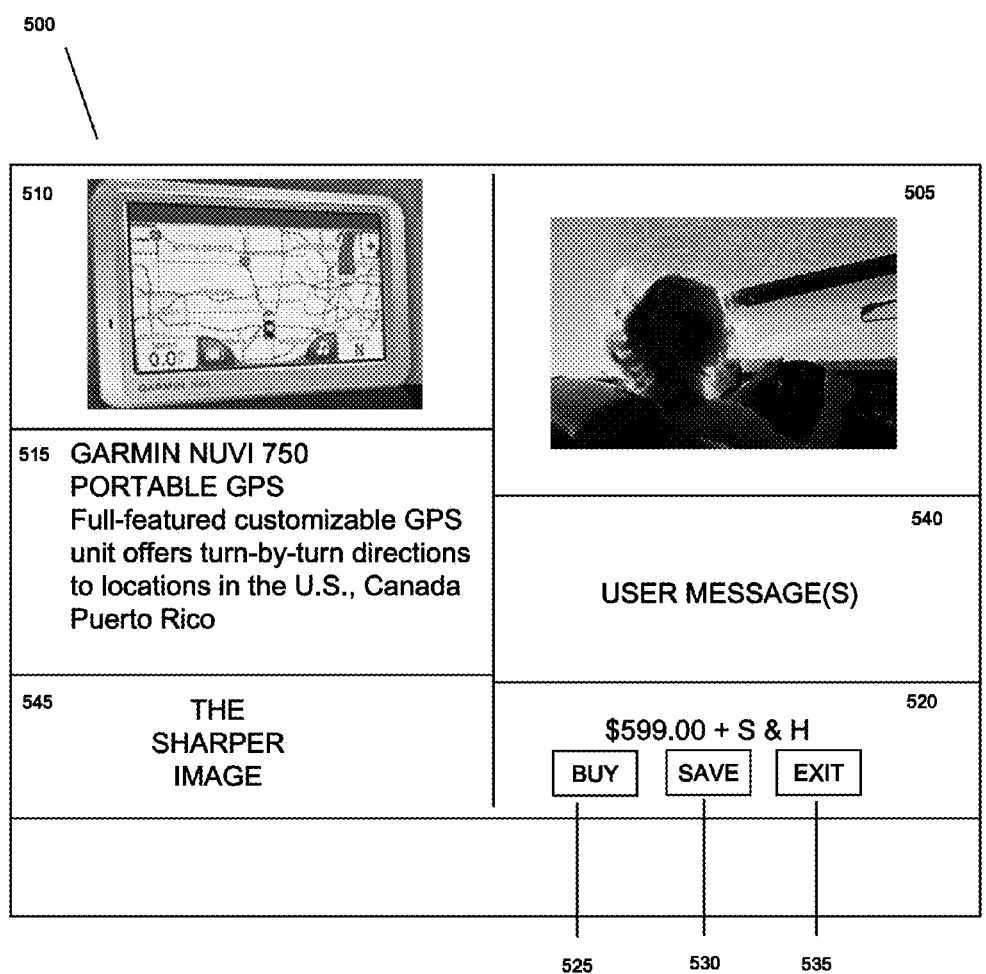
FIG. 5 is an exemplary video screen through which users may save and respond to advertisements according to an embodiment of the invention.

FIG. 5 is one example of a screen 500 in which the primary video content is squeezed back into a smaller viewing area 505 to allow for the overlay and information about the product being advertised to be shown in multiple screen areas. Such information may include, for example, an image of the product 510, textual information about the product 515, pricing information 520, and a button bar that includes actionable screen elements (menu buttons) to buy the product (525), save the content or advertisement (530) or exit (535) and return to the normal, full-screen viewing mode. Action buttons can have two states: no focus (not selected) and with focus (selected). In some instances, there may be other user messages 540 such as time limited offers, sales, complementary products, as well as logo, trademark or other branding information 545 identifying the source of the product being offered.

Figure 6:
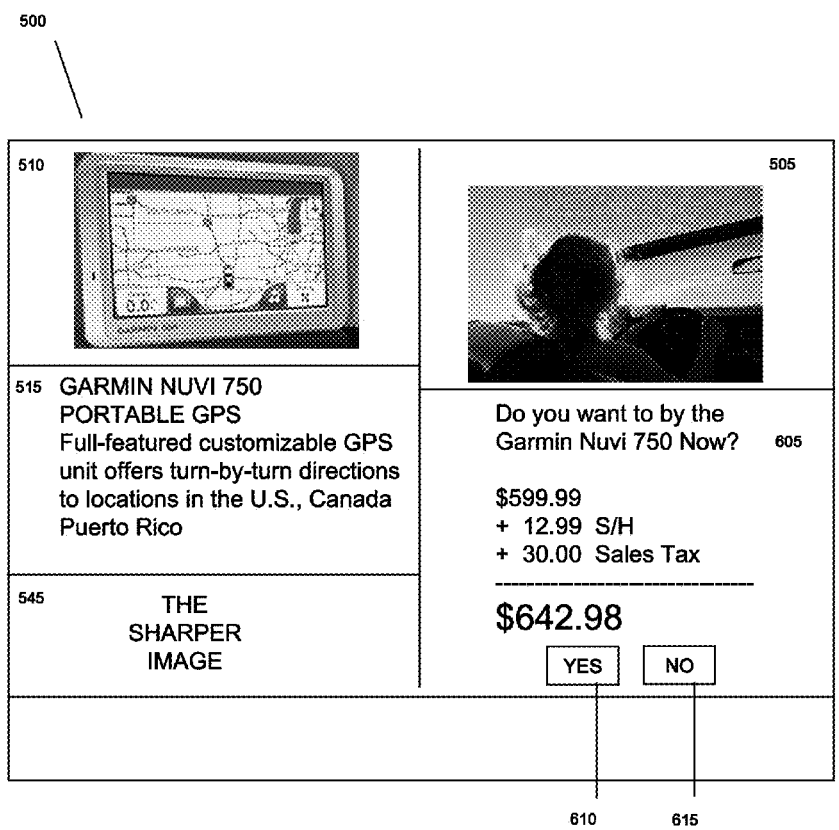
FIG. 6 is another exemplary video screen through which users may complete a purchase transaction according to an embodiment of the invention.

If the user elects to purchase the item being offered, a screen such as that shown in FIG. 6 may be presented. The screen includes many of the same screen areas as shown on previous screens (product image, description, squeezed-back video) but also includes a purchase screen area 605 that includes more details regarding the user's purchase. For example, the purchase screen area 605 may include additional fees (taxes, shipping), optional equipment, extended warranties, etc. A "YES" button 610 is provided to permit the user to completed the transaction, and a "NO" button 615 allows the user to cancel the transaction.

Generally, the interface for the squeeze-back state includes multiple screen areas, with each area being allocated to specific information or functions, including an information bar for presenting product-related information. The screen real estate allocated to each area may be fixed, or in some implementations may be a function of the amount and/or size of what is displayed in each area. For example, a larger logo may require the brand logo area to be larger, and thus require a reduction in the space allocated to the product title area. As with the overlay, each screen area may be allocated a particular width and height, either based on a relative size of the area (e.g., 90% width and 10% height of the overall screen), or absolute size (e.g., number of pixels, inches, centimeters, etc.). Different size allocations may be used for different image sizes and/or resolutions, such as letterbox versus standard formatting, high-definition images, etc.

More specifically, the information bar may be used to display information about the product being sold or content that may be saved for subsequent viewing. The information bar may include images and/or text, which may be provided using a content management application, as described further below. Exemplary information that may be presented in the information bar includes, but is not limited to, a main product image, a product description that may include a product name, and in some cases a product subtitle, the space for which may be allocated to other product or branding information if not used. In some cases, if a branding or logo image is not provided, the product description may extend down beyond the height restriction for the product description area to utilize the space otherwise allocated to the branding and logo area.

In some implementations, the viewer may interact with the screen when it is in squeeze-state using a remote control device. The following table provides an exemplary listing of buttons and respective functions.

| Button | Action |
| --- | --- |
| Arrow Left/Right | Horizontally Scrolls through button bar |
| Arrow Up/Down | Vertically moves to next logical item where and when applicable. |
| SEL | Selects whatever button has focus |
| EXIT | Exits to full TV, tears down template |
| A, B, C | Ignored |
| Last | Tears down template and goes to last channel |
| Page | Ignored unless overlay is placed over video on demand content |
| Video Controls | Ignored unless overlay is placed over video on demand content |
| CH +/− | Tears down template and tunes to next/prior channel |
| Numeric Buttons | Tears down template and directly tunes channel associated with numeric entry |
| Info | Info barker is displayed in TV window |
| Record | Tears down template and performs normal UI button function for 8300 set-top-boxs |
| DVR | Tears down template and performs normal UI button function for 8300 set-top-boxs |

As described above, the user may save content to be stored in a user-specific (or in some cases, household specific) content folder that may be accessed from a main menu screen of the set-top-box or, alternatively, from a web page. Each saved item may include a title and/or description of the saved content as text. In some embodiments, the title remains in the stored content folder until it has expired. In some implementations, when a viewer selects or rolls-over a saved title, a highlight state will replace its background. When the saved title is selected, the highlight state changes again (e.g., flashes or changes color) to indicate that an action was taken. The titles may be presented in any order, but common ordering schemes such as by date saved, alphabetically, or grouped by content type may be used. In some instances, the presented titles may include items not selected by the viewer (e.g., new items, popular items, items selected based on similarities to selected items) and populate otherwise empty title areas.

Figure 7:
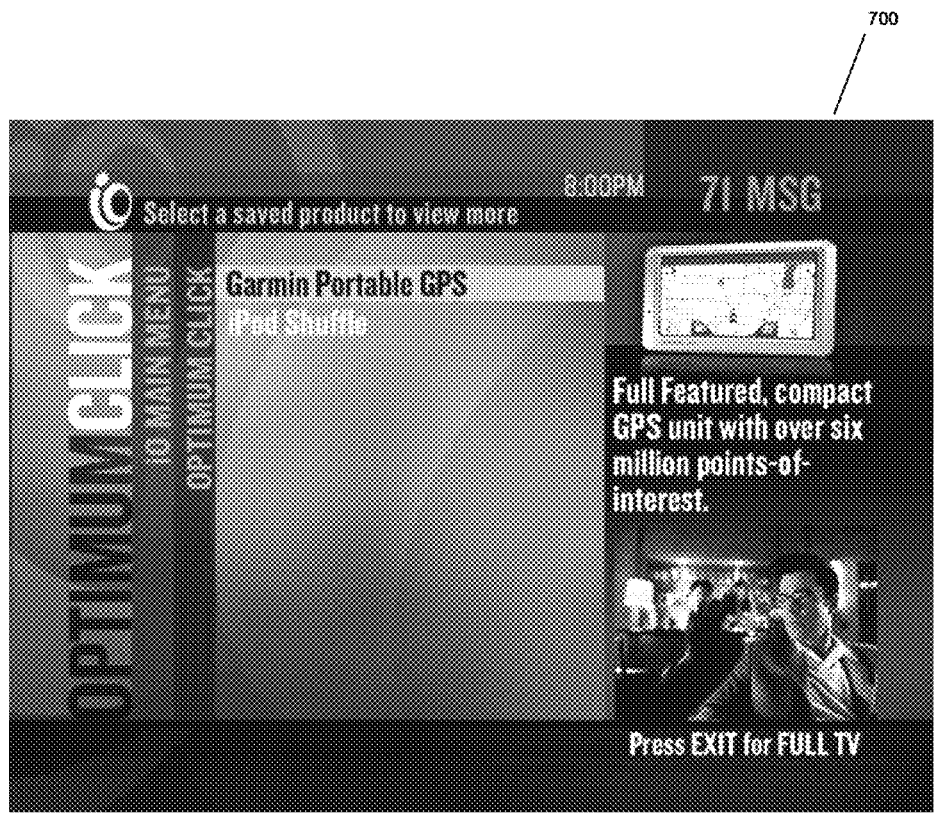
FIG. 7 is an exemplary video screen presenting previously viewed and stored content bookmarks associated with an individual user according to an embodiment of the invention.

In some cases, a sidebar area is presented and may change as the user highlights different selections from the title listing Like the product screen, this area may also include an image, a product description, a price, and other purchase-related information. If a graphic image (e.g., a JPEG or GIF) is to be presented, it may be provided using the content management application. The image may have resolution and/or size limitations, and in some cases may be automatically scaled down proportionally to the required image size. Similarly, the content management application may be used to provide the text (e.g., product description, price, etc.) that accompanies the product or title. FIG. 7 illustrates one such example of a stored content screen 700 that includes multiple stored items.

Figure 8:
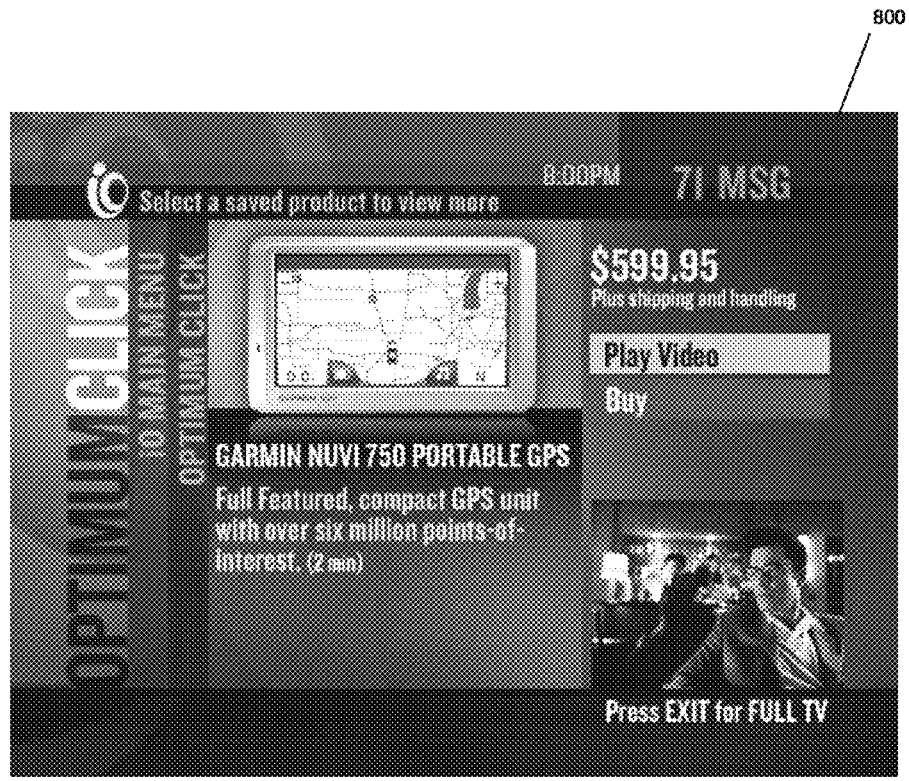
FIG. 8 is another exemplary video screen presenting a previously viewed and stored advertisement according to an embodiment of the invention.

FIG. 8 illustrates a more detailed stored content screen 800 that is presented once a viewer selects an item from the title list. As with the main screen, the detail screen may include a sidebar area that includes, for example, an image, a product description, a price, other purchase-related information and actionable buttons to play the content and purchase the product. For content, the information may also include run-time information, copyright and licensing information, expiration date(s), as well as other metadata about the content. If a graphic image (e.g., a JPEG or GIF) is to be presented on the detail screen, it may also be provided to the system using the content management application, and may be the same or a different image (or images) as displayed on the main screen. The images may have resolution and/or size limitations, and in some cases may be automatically scaled down proportionally to the required image size. Similarly, the content management application may be used to provide the text (e.g., product description, price, etc.) that accompanies the product or title on the detail screen.

Content action buttons allow viewers to take actionable steps to a destination or function associated with the saved item. This action can route the user to a VOD menu or content, dedicated channel or commerce experience. For example, if the saved item is provided as VOD content, a Play Video button connects the viewer to that VOD. If the content is commerce related, selection of a "Buy" button connects the viewer to that commerce experience. If the content action button directs a viewer to a dedicated channel, the viewer is sent to a destination with a channel tune, regardless of whether the associated destination is an interactive, dedicated or ad channel. Content linking from this button can include, but is not limited to, VOD, commerce, channel tuning, UI linking, e-mail and click-to-call. The button design may include a graphic or text hyperlink, and allows for an on and off state.

By maintaining a listing of user-stored content bookmarks at a centrally-accessible location (or set of locations) viewers may access their stored content folder using any number of communication networks and protocols, including cable-television systems, Internet-based systems and wireless devices. For example, a user may be presented content relating to a consumer electronics such as the GPS navigation system illustrated in the FIGS. 4-8 while viewing a football game in his living room. However, not wanting to miss any of the game, he instructs the system to save the content and quickly returns to watching the game without having to provide any purchase information. Later, while away from his television and computer, he recalls saving information about the GPS system. Using a mobile device (e.g., a phone, personal data assistant, etc.) he connects to a WAP-enabled portal to the system, through which he can view his saved content folder and complete the purchase.

Functions similar to those described above with respect to a set-top-box are also available via a computer connected to the World Wide Web. As such, information, purchasing opportunities, access to content, user actions and account information is available across both platforms, thereby allowing a comprehensive view of a customers viewing and purchasing activities. In general, the Internet-based platform allows subscribers to securely purchase products via banner ads, emails, commerce-enabled co-branded web pages, and directly from partner websites while using information stored in a common user profile. The user profile may be attributed to an individual or a household, and in some instances, a household account may include multiple subaccounts for individual members of the household. Some user profiles may also require a password or PIN to be used for purchasing transactions.

Generally, any user with access to a user profile may purchase or save content, and transactions are associated with each profile. To purchase a product or save content, the subscriber clicks or otherwise selects an advertisement (e.g., a banner ad). The subscriber is presented with a co-branded partner web page, at which she may purchase the product on a secure commerce-enabled web page. Email may be used to inform the subscriber of a successful or unsuccessful transaction. If the subscriber does not wish to complete the purchase, the content (e.g., the ad, related videos, text, etc.) may be saved for subsequent action.

Saved content may be accessed via the content folder via a secure website or a set-top-box, as described above. In some embodiments, the website may be formatted and presented such that subscribers can view and interact with the website using a personal computer, a hand-held device, WAP-enabled telephone, PDA or other such devices. Subscribers may view purchases and full transaction histories and transmit order information via the system which in turn routes it to the correct commerce partner for processing. Like the cable-television based system, subscribers can save content for subsequent viewing and or purchasing. Saved items within the content folder may be sorted by date, title, price as well as other metadata associated with the content.

Figure 9:
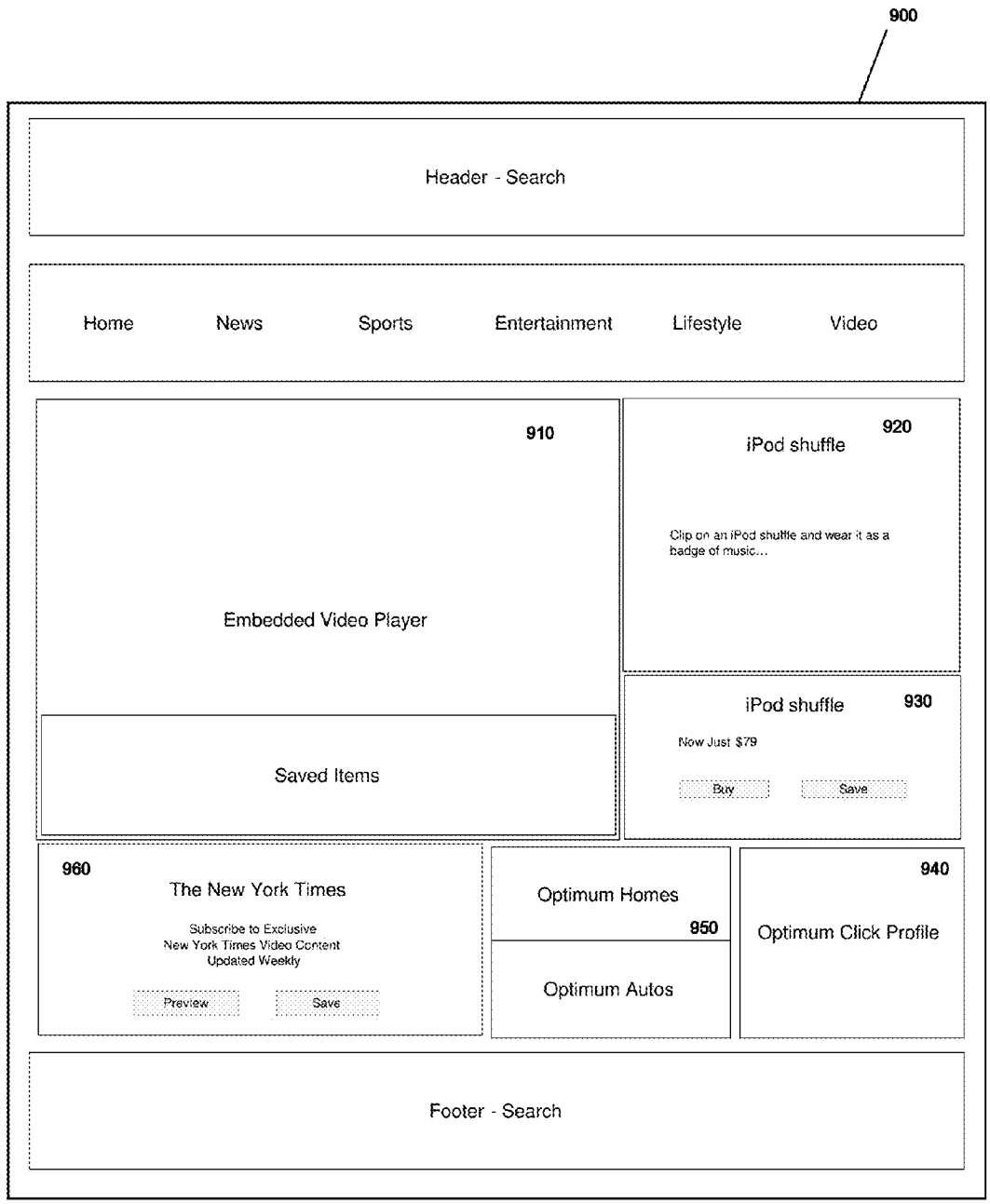
FIG. 9 is an exemplary web page comprised of advertisements according to an embodiment of the invention.

FIG. 9 illustrates an exemplary web page 900 that presents the user with the web-based stored content folder. The page 900 displays the stored content folder and may include an embedded video player 910 with a list of saved items (saved by subscribers or pre-loaded), and a description of a product or products featured in video advertisements which may be synchronized with product featured in video. The video player 910 may be used to display video or other content saved as content bookmarks created during a previous session, thus allowing the user to review items of interest that have not yet been purchased. Selecting a particular saved item from the list of saved items may, for example, cause the video advertisement for that item to be played. When a video is not playing, full size or partial page ads 920, 930 may be presented. From this screen, a subscriber may also update her profile, manage a password or PIN, view the status of her orders and other transaction history, and view other advertisements and offers.

The following figures illustrate exemplary process flows for the purchase and save functions available to subscribers within the Internet-based platform. Similar to the creation of content bookmarks using the cable-television interface described above, content bookmarks saved using the Internet-based interface also permit the user to review and complete a purchase using her set-top-box as part of a cable-television system, or a WAP-enabled device via a wireless service. In each case, a single stored content folder maintains a user's content bookmarks created using any of the various services provided by the MSO.

Figure 10:
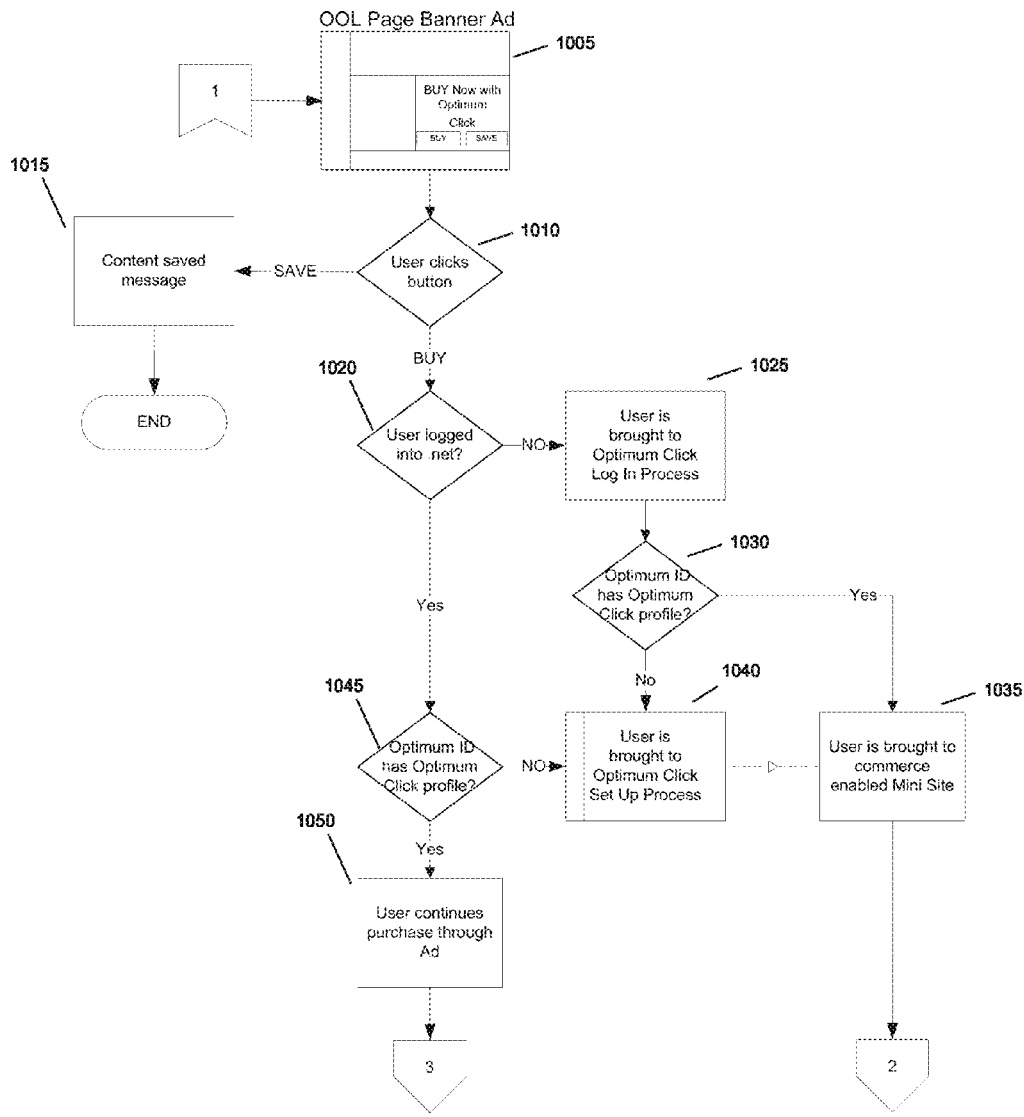
FIG. 10 is a flow chart of an Internet-based purchase process according to an embodiment of the invention.

Referring to FIG. 10, a user navigates to a web page (STEP 1005) that includes the click-to-buy and/or click-to-save functionality. The functionality may be implemented, for example, in one or more advertisements placed on the web page, or in a separate "purchase" applet included in the web page itself. In some embodiments, actionable interface elements such as hyperlinks, buttons or other objects may included in the page to allow the user to select the appropriate action (STEP 1010). If the user is interested in saving the ad for subsequent review and/or purchase at a later time, she may select a "SAVE" button and the content message is saved (STEP 1015) as a content bookmark for later retrieval and action.

If the user wishes to purchase the item being offered, she may select a "BUY" button. In some implementations, users must have an existing user profile and be logged into the system in order to complete a purchase. This allows the system operator to confirm the user's identity, pre-fill certain data fields (shipping address, credit card number, etc.) and track the purchase histories of users to assist with customer profiling and cross-selling efforts. In such cases, the system checks if the user is logged into the secure site (STEP 1020). If not, the user is presented with a login screen (STEP 1025) at which the user can enter her user ID, password, and/or other identification information.

Figure 11:
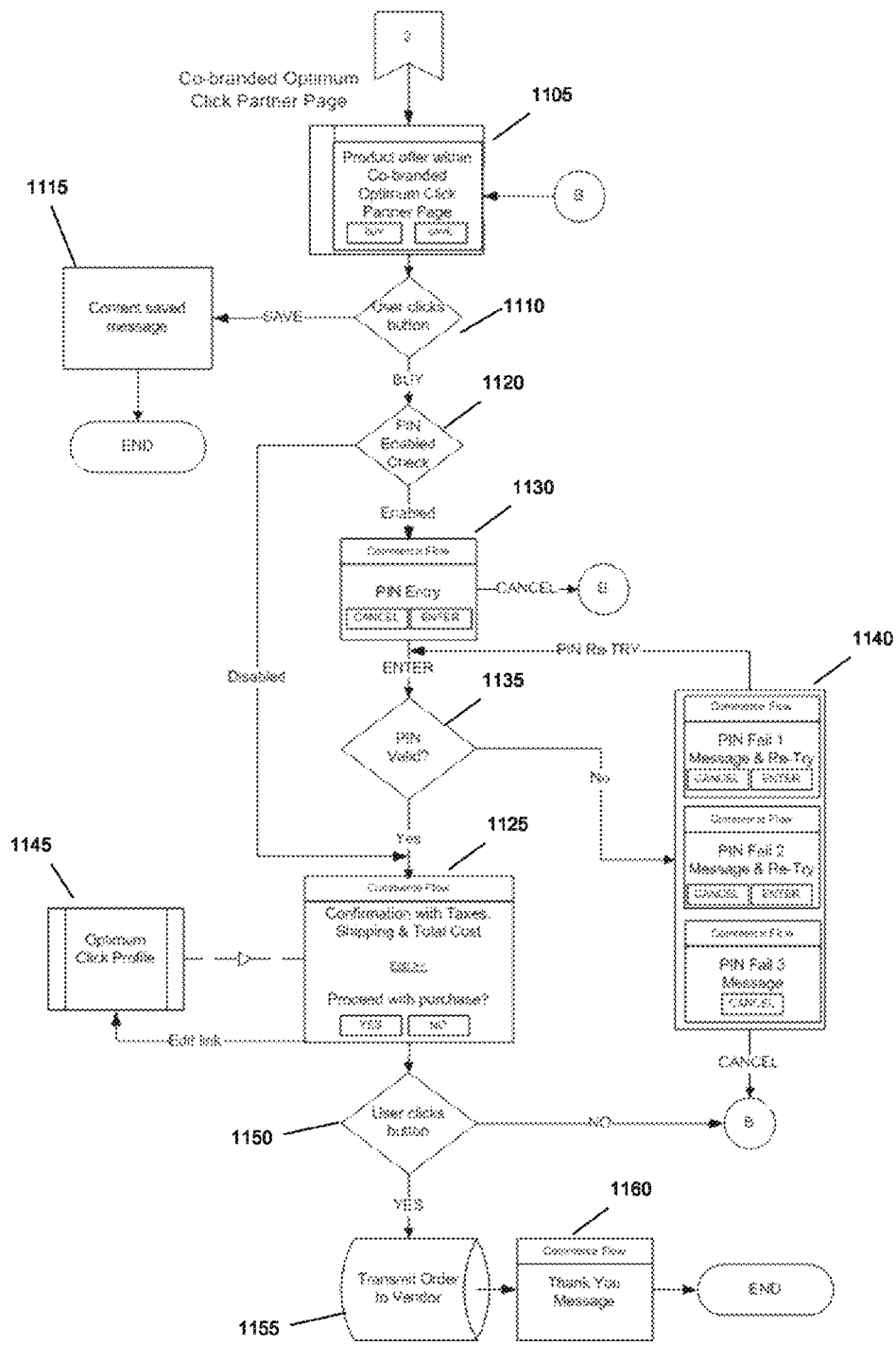
FIG. 11 is a continuation of the flow chart of FIG. 10 illustrating additional steps of an Internet-based purchase process according to an embodiment of the invention.

In some embodiments, a second layer of user authentication is used to further identify the user. For example, even though a user may be a subscriber to the Internet service provided by the MSO and have a valid login ID, she may not have been approved to purchase products via the service. In such cases, the system checks if the user ID provided in step 1025 as a click-to-buy profile (STEP 1030). If so, the user is validated and presented with a web page similar to that as described with respect to FIG. 9 above (STEP 1035), and the process continues as illustrated in FIG. 11. This process permits the user to purchase products directly through the service provider's web interface. If the user does not have a click-to-buy profile, she is presented with a profile set up page (STEP 1040).

If the user is already logged into the secure site, the system checks for a valid click-to-buy profile (STEP 1045) and, if present, she may continue to purchase the product via the selected advertisement (STEP 1050) as a co-branded page, following similar steps as illustrated in FIG. 11.

Referring now to FIG. 11, an authenticated user is presented with a product offer page (STEP 1105) that includes actionable screen elements that facilitate the purchase of the product or the creation of a content bookmark for subsequent recall and review. For example, the user may click a button (STEP 1110) to save the advertisement as a content bookmark (STEP 1115). Because the content bookmarks are uniquely associated with the user, they can be recalled and presented to the user in her saved content folder as described above with respect to FIG. 9. Further, because the service is provided in conjunction with other communication services (cable-television, wireless, etc.) the content folder may be viewed using other devices operating on other networks and/or protocols such as an set-top-box, wireless device, or cell phone.

Some embodiments may implement a PIN request function (STEP 1120). In cases in which no PIN is required, the user is immediately presented with the payment confirmation page (STEP 1120). If, however, a PIN is needed to continue the process, the user is presented with a PIN entry screen (STEP 1130) and her PIN entry is validated (STEP 1135). If an incorrect PIN is entered, a series of PIN retry screens may be presented as described above.

Returning to STEP 1125, the system may retrieve user profile information (STEP 1145) from the user profile storage (described above with reference to FIG. 2) to pre-fill certain information on the confirmation screen. For example, the user's address may be used to calculate sales tax and/or shipping costs, which may then be presented on the screen, providing the user with the total cost of her purchase. If the user clicks the "YES" or "CONTINUE" button (STEP 1150) the transaction is completed and the information is forwarded to the vendor (STEP 1155) for fulfillment of the order. A thank you screen may be presented (STEP 1160) indicating the process has been successfully completed.

Content Management Application

Content elements that are used to populate the screen areas in the overlay, squeeze-back interface and saved content folder screen are preferably defined using a web-based content management application (CMA), which may also be used to create the entire viewer experience for product and content offerings, referred to herein as "campaigns." Using the CMA, campaign administrators may coordinate content, advertising, offers, text, and images across linear broadcast content, overlay screens, as well as advanced advertising channels (e.g. dedicated channels, niche channels, micro-site channels) to facilitate reporting and campaign management. Each step is described in greater detail below.

Step 1—Create Campaign

To create a new campaign, a campaign manager selects an existing merchant or product partner via a drop down control, or creates a new client via an "Add" button. The campaign manager then selects an existing campaign via drop down control or creates a new campaign via the "Add" button. The campaign manager then selects a campaign initiative (e.g., a product or channel).

Step 2—Add Campaign Elements

The campaign manager designs and adds campaign elements to the content overlay, the squeeze-back interface and other screens presented to the viewer during the click-to-buy or click-to-save workflow. A workorder id (a system-assigned internal, unique number) is created to allow tracking and reporting of all activities within a campaign. Text boxes are provided for entering the product title and description, preferably including a maximum character counter that counts down the remaining characters the user may enter, starting from a maximum character limit. Check boxes are provided to include the actionable screen elements such as the Save, Buy, Go To (which requires entry of a channel number or call sign) and Exit buttons. An option to display a brand logo is provided, and if no logo is selected, the maximum character limit allocated to the product title and/or description may be increased as appropriate. A text box is provided to enter a linear TV Spot Id to facilitate campaign management and reporting when the campaign is associated with particular broadcast content.

For campaigns that include a purchase option, text boxes are provided that allow for entry of a confirmation question prompting users to confirm a purchase or subscription; and a text box for entering a message to thank the user when a purchase is completed and, in some cases, to display an estimated delivery date. A text box is also provided into which the campaign manager may enter price and shipping information. In some cases, this information may be automatically populated through integration with other commerce systems or data feeds from commerce partners. The campaign manager may also upload brand and/or product images, which are automatically associated with the product on upload completion, and a thumbnail version of the image then appears on screen. Any of the text and graphics may be changed at any time by updating the information on this screen.

Step 3—Add Campaign Video

A drop down control is used to select videos to be associated with a product or content that is added to the user's saved content folder when a "Save" action is taken. Multiple videos can be added sequentially and associated to one product. Additional VOD metadata may also be added, edited or removed that is specific to certain screens (e.g., different thumbnail sizes, different video description lengths). Once completed, the campaign manager may review all entered data and text as part of a quality assurance process.

Step 4—Reporting

To manage and monitor the progress and success of campaigns and, in some cases, overall usage of the system, various reports may be generated and presented to the campaign manager. Examples of such reports include, but are not necessarily limited to:

Metric Reports from Linear Spot—including number of Overlay Impressions, Unique Overlay Impressions by household (HH) and set-top-box, Number of Clicks, Unique Clicks HH and set-top-box, Total Click %, Unique Click % (Unique Clicks/Unique Imps), Overlay Impressions and Uniques by Channel, Clicks and Unique Clicks (HH & set-top-box) by Channel and Success rate of Overlay display (Overlay Imps/Spot Imps).

Metric Reports from Within the Click Squeeze-back Interface—including Unique HH and set-top-box Visitors (Home Ids), Returning Visitors (returning to same campaign and returning to any Click campaign), Visits, Average Time per Viewer Visit (mm:ss), Page Views (each click will be tracked as a separate page to facilitate conversion analysis), Average Page Views per Visit, Error Messages/Codes, Total and Unique (set-top-box and HH) Saves, Save % of Visits, Total and Unique (set-top-box and HH) Buys, Buy % of Visits, Total and Unique (set-top-box and HH) Exits (either Remote "Exit" button or screen Exit button), Exit % of Visits, Total and Unique (set-top-box and HH) Timeouts and Timeouts % of Visits.

Metric Reports from the Saved Content Folder—including Total and Unique (HH and set-top-box) VOD Plays by Title and Campaign, Average VOD Play Time per VOD Title and Campaign (mm:ss), VOD Trick Play, % Sub 15 Second Plays, Action % (Play, Buy, Go To, etc.) per Visit to the saved content folder, Unique HH and set-top-box Visitors (Home Ids), Returning Visitors (returning to same campaign and returning to any Click campaign), Visits, Average Time per Viewer Visit (mm:ss), Page Views (each click will be tracked as a separate page to facilitate conversion analysis) and Average Page Views per Visit.

Click Purchase Metric Reports—including Total and Unique # of Orders, Total Sales Revenue, # of Successful Orders, # of Order Attempts, Number of cancelled Orders, Order Completion Conversion by Product, by Channel, by Campaign, and Average Sales per Visitor.

Click Save Metric Reports—including Total and Unique # of Saves, Average # of items per Household with Saved Items, and Saves by Product, Channel, Campaign.

Click Profile Activity Metric Reports—including, New Accounts, Active Accounts, Deleted Accounts, Signup conversion rate (new accounts/Uniques that started the signup process) and Drop off analysis of signup pages.

In each case, the various reports may be aggregated or grouped based on various data fields, demographics and other reporting parameters. For example, the reports may be presented by various time periods, such as by hour, day, calendar week, broadcast week, month, year, campaign term, or a user-selected time period. The reports may also (or alternatively) aggregated by advertisement, overlay, campaign ID, advertiser, ad agency, channel, product, product category (e.g., consumer electronics, sporting goods, etc.), commercial ID, as well as others. Economic, geographic and demographic segmentation may also be used to identify trends by user characteristics and locations as well as price points of the products being offered.

Other metrics that may be collected and reported include: Average Time Viewed per Overlay and campaign, Number of complete Overlay views, Number of mid-point Overlay views, Total Time Spent Watching by Overlay copy, Average Save to Play Duration, Save to Play Conversion Rate (Saves/Plays), and # of Units Sold.

In some embodiments, the system also includes link tracking and segmentation analysis functionality such clickthroughs are tracked from ads into a dedicated ad channel as a separate metric from other entry paths into that ad channel, thereby providing insight into how users navigate though the pages, advertisements and/or screens, and indicated which paths are most effective.

Together, the CMA and the systems and methods described herein provide a flexible and user-centric approach to providing electronic commerce functionality via a multitude of delivery channels. As such, users can view, store, and act on advertisements via a cable-television interface, personal computer, WAP-enabled wireless devices, and cell phones seamlessly and without having to remember or re-enter information when changing from one content delivery channel to another. This collective and centralized approach allows MSOs the opportunity to partner with consumer product companies and other entities offering products and services to increase product exposure, user interactions, and ultimately revenue generated by product sales.

The invention claimed is:

1. A system for presenting an offer to procure an asset to a consumer, the system comprising:
    an application server for generating an advertisement overlay comprising information about the offer and an actionable interface element;
    a transmission server for providing separate interfaces to a set-top box, to a client computer, and to a WAP-enabled device, wherein the separate interfaces are provided respectively by:
        (i) a video delivery server for providing video content to the set-top box, the video content comprising a primary video stream covering substantially all of a viewable display area, the advertisement overlay being displayed within the viewable display area and over the primary video stream,
        (ii) a web server for providing content and web-based advertisements to the client computer via a web browser, and
        (iii) the WAP-enabled device for providing wireless content via a wireless network;
    a transaction server for detecting selection of the actionable interface element, by the set-top box via a cable network; user interaction with the WAP-enabled device via the wireless network; and user interaction with the web-based advertisements, by the client computer, via the Internet and, in response thereto, generating, using the application server, a content bookmark identifying the offer and the consumer, such that the content bookmark may be subsequently recalled to complete a transaction at a later time by the consumer:
        on the set-top box via the cable network, if the transaction server detected an initiation of the transaction through at least one of user interaction with the web-based advertisements by the client computer via the Internet and user interaction with the WAP-enabled device via the wireless network;
        on the WAP-enabled device via the wireless network, if the transaction server detected an initiation of the transaction through at least one of user interaction with the web-based advertisements by the client computer via the Internet and selection of the actionable interface element by the set-top box via the cable network; and
        on the client computer via the Internet, if the transaction server detected an initiation of the transaction through at least one of selection of the actionable interface element by the set-top box via the cable network and user interaction with the WAP-enabled device via the wireless network,
    such that the set-top box, WAP-enable device, and the client computer can be used interchangeably by the consumer; and
    a data storage server for storing a plurality of content bookmarks that identify recallable content for future viewing and purchase, wherein the data storage server is remote from the set-top box, from the WAP-enabled device, and from the web browser of the client computer and avoids storing content on the set-top box, the WAP-enabled device, and within the web browser.

2. The system of claim 1, wherein the web server is adapted to receive, from the consumer and via the client computer, a request to view the content bookmark and to present the content bookmark in response thereto.

3. The system of claim 2 wherein the transaction server is configured to receive a request to procure the asset via the web server.

4. The system of claim 1 wherein the video delivery server is configured to receive, via the set-top box, a request to view the content bookmark, the video delivery server presenting the content bookmark in response thereto.

5. The system of claim 4 wherein the video delivery server, in response to the request to view the content bookmark, is configured to format the primary video stream into a screen area substantially smaller than the viewable area and to add thereto procurement information about the asset in the remainder of the viewable area.

6. The system of claim 4 wherein the transaction server is responsive to the video delivery server, and in response to an asset procurement request received therefrom, effectuates a procurement of the asset.

7. The system of claim 1 further comprising a content storage device for storing content used by the application server to generate the advertisement overlay.

8. The system of claim 1 wherein the video delivery system adds the advertisement overlay in response to a trigger event.

9. The system of claim 1 further comprising a database for storing a content folder uniquely associated with the consumer, the content bookmark being stored in the content folder.

10. The system of claim 1 wherein the client computer comprises a mobile cellular telephone.

* * * * *